United States Patent
Steiner

(10) Patent No.: US 6,735,025 B2
(45) Date of Patent: May 11, 2004

(54) HOLDING DEVICE FOR AN IMAGE-INFLUENCING OPTICAL COMPONENT OF AN OPTICAL IMAGE-FORMING DEVICE AND IMAGE-FORMING DEVICE INCORPORATING SUCH A HOLDING DEVICE

(75) Inventor: Carl Steiner, Bindlach (DE)

(73) Assignee: Steiner-Optik GmbH, Bindlach (DE)

( * ) Notice: Subject to any disclaimer, the term of this patent is extended or adjusted under 35 U.S.C. 154(b) by 0 days.

(21) Appl. No.: 10/352,991

(22) Filed: Jan. 29, 2003

(65) Prior Publication Data

US 2003/0142420 A1 Jul. 31, 2003

(30) Foreign Application Priority Data

Jan. 29, 2002 (DE) .......................... 102 03 252

(51) Int. Cl.⁷ .......................... G02B 7/02; G03B 17/26; G03B 21/14; F21V 17/00
(52) U.S. Cl. ...................... 359/819; 359/811; 396/526; 362/455; 353/100
(58) Field of Search ................................ 359/811, 819, 359/407, 421, 405, 383, 411, 417, 418, 422; 396/526; 362/455; 353/100

(56) References Cited

U.S. PATENT DOCUMENTS

| 4,867,533 A | | 9/1989 | Akin, Jr. |
| 5,194,987 A | * | 3/1993 | Moore et al. ............... 359/422 |
| 5,969,858 A | | 10/1999 | Funatsu |
| 6,104,531 A | * | 8/2000 | Dross ......................... 359/422 |

FOREIGN PATENT DOCUMENTS

| DE | 44 12 901 | 10/1994 |
| DE | 299 18 115 | 2/2000 |
| JP | 57086807 | 5/1982 |
| JP | 11211961 | 8/1999 |

OTHER PUBLICATIONS

Patent Abstract of Japan, Publication No. 2000258675, "Visibility Correcting Mechanism for Binoculars," Sep. 22, 2000.

* cited by examiner

Primary Examiner—Hung Dang
Assistant Examiner—Joseph Martinez
(74) Attorney, Agent, or Firm—Browdy and Neimark

(57) ABSTRACT

An image-forming device, especially an optical magnifying device, e.g., binoculars or a telescope, has an image influencing optical component, more specifically an eyepiece. The same is held by means of a holding device in such a way that the optical component is axially displaceable along the optical axis of the image-forming device. The holding device comprises a component holding element that is attached to and cannot move relative to the optical component, said component holding element having an adjustment marking, e.g., a dial with a plurality of individual markings reflecting the current axial position of the optical component. The holding device additionally has a marking member to accentuate at least one individual marking on the adjustment marking. With the aid of the marking member the axial position of the optical component can be marked prior to an axial readjustment of the same so that the axial readjustment can easily be reversed. This simplifies adjusting the image-forming device to the optical requirements of different users.

9 Claims, 3 Drawing Sheets

(12)(54) HOLDING DEVICE FOR AN IMAGE-INFLUENCING OPTICAL COMPONENT OF AN OPTICAL IMAGE-FORMING DEVICE AND IMAGE-FORMING DEVICE INCORPORATING SUCH A HOLDING DEVICE

BACKGROUND OF THE INVENTION

1. Field of the Invention

The present invention is concerned with a holding device for an image-influencing optical component, especially for an eyepiece, of an optical image-forming device, especially an optical magnifying device, e.g., binoculars or a telescope, according to the preamble of claim 1. The invention is furthermore concerned with an image-forming device incorporating such a holding device.

2. Background Art

Holding devices of the above type are known on the market for holding eyepieces in binoculars. With the aid of the axially displaceable optical component, the image distance of the binoculars can be adjusted especially to users with different visual acuities. To name an example, the binoculars may be used both by a person with non-defective vision, as well as by an eyeglass wearer. It is a shortcoming of the known eyepiece holding means that a re-adjustment of the axial positions of the eyepieces is required each time the user changes. Such an adjustment becomes particularly difficult in the case of a binocular eyepiece if different axial positions for different users must be adjusted for each of the two eyepieces in a pair of binoculars.

SUMMARY OF THE INVENTION

It is therefore an object of the present invention to improve a holding device of the above type in such a way that adjusting the eyepiece to the requirements of different users is simplified.

This object is met according to the invention with a holding device having the characteristics of claim 1.

A marking member enables a first user to accentuate on the adjustment marking of the holding device the axial eyepiece positions that are optimal for him. After the image-forming device has been used by another user in the meantime, the optimal axial position for the first user can quickly be reset with the aid of such an accentuation without requiring an optical adjustment.

An implementation of the holding device according to claim 2 ensures that the marking member is not inadvertently moved during use.

Fixing means according to claim 3 permit a simple yet reliable fixing of the marking member.

A snap-in locking device according to claim 4 results in an increased flexibility regarding the design of the marking member and component holding element using an interposed snap-in locking member compared to a design of the snap-in locking device in which the snap-in locking member is integral with the marking member or component holding element.

A snap-in locking member according to claim 5 can be designed very simply.

A snap-in locking ring according to claim 6 may be disposed between the marking member and component holding element in such a way that it is virtually undetectable from outside, so that the snap-in function is designed hidden inside the holding device.

The components of a holding device according to claim 7 may be executed without undercutting.

A snap-in locking ring according to claim 8 is easily accessible.

A marking member according to claim 9 offers the option of fixing the same with a high position resolution and, hence, precise accentuation of the axial position being marked.

It is a further object of the present invention to create an image-forming device that, when the user changes, can be easily changed for adjusting purposes to the optical requirements of the new user.

This additional object is met according to the invention with an image-forming device having the characteristics of claim 10.

The advantages of the image-forming device result from the described advantages of the holding device.

An embodiment of the invention will be explained in more detail below based on the drawing.

DESCRIPTION OF THE PREFERRED EMBODIMENT

Figure 1:
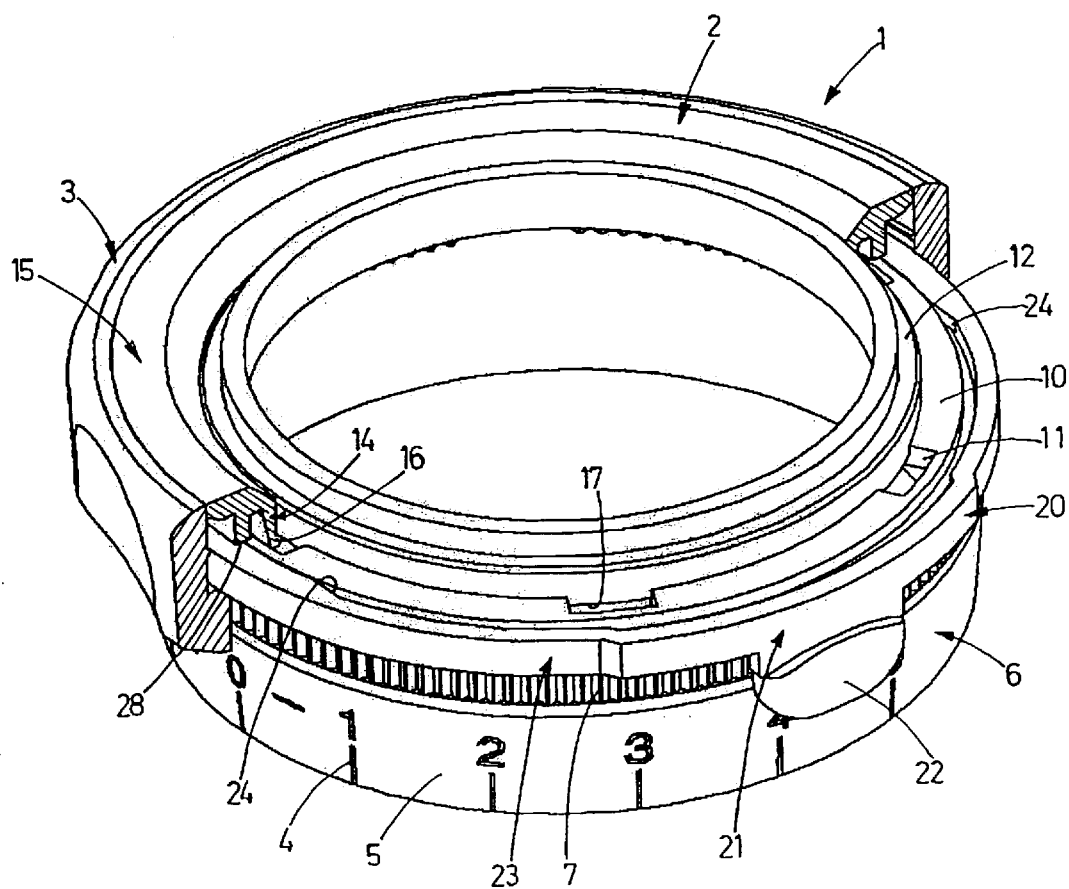
FIG. 1 is a partially exploded view of an inventive eyepiece holding device shown in a fixed position.
Figure 5:
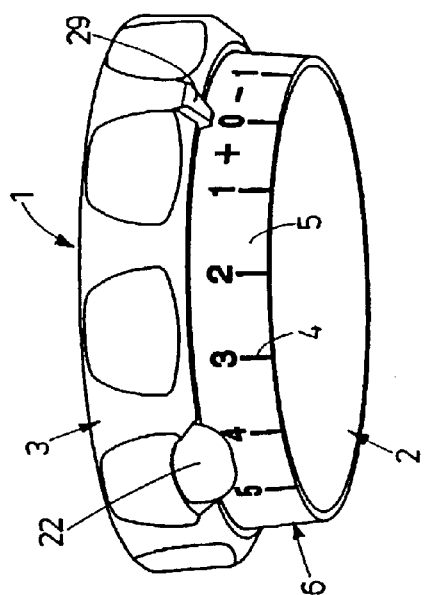
FIG. 5 shows a view in the perspective of the eyepiece holding device in a fixed position.

FIG. 1 shows an eyepiece holding device marked in its entirety with the reference numeral 1 in a partially exploded view. All components of the eyepiece holding device 1 are made of plastic.

The eyepiece holding device 1 is a component of a pair of binoculars not shown in FIGS. 1 through 5. It comprises a multi-part eyepiece mount 2, as well as a marking ring 3. The latter serves, by means of an integral marking nose 29, to accentuate a selectable individual marking in the form of a numerical reading on a dial 4, which is worked into an area visible from outside of a surface 5 of the eyepiece mount 2. The dial 4 of the eyepiece mount 2 cooperates with an opposite marking on a frame support element of the binoculars (see FIGS. 6 through 9) that is attached to and cannot move relative to the frame. By rotating the eyepiece mount 2 relative to the frame support element, the eyepiece mount 2, as is known from binoculars, can be displaced axially together with the eyepiece in the direction of the optical axis of the eyepiece to adjust the image distance of the binoculars.

The dial 4 is applied on an annular main body 6 of the eyepiece mount 2, which is rotation-symmetrical around the optical axis of the eyepiece. In FIG. 1, above the dial 4, the main body 6 has a circumferential outer toothed ring 7.

On the side opposite the outer toothed ring 7, the outside diameter of the main body 6 is reduced along altogether three step-shaped offset areas, that will be referred to below as outer circumference steps and can be seen especially in FIGS. 2 and 4.

A first outer circumference step 8 adjoins a flat circumference region 9 immediately above the outer toothed ring 7. A second outer circumference step 10 follows, into which altogether six snap-in receptacles 11, the function of which will be explained later, are worked-in, evenly spaced along the circumference of the main body 6. A third outer circumference step 12 adjoins the second outer circumference step 10.

In the region of the second outer circumference step 10 the inner surface area of the main body 6 has toothed ring segments 13 (see FIGS. 2 through 4) formed between the snap-in receptacles 11 that cooperate with the frame support element of the binoculars (see FIGS. 6 through 9).

In the region of the second outer circumference step 10 the inside diameter of the main body 6 also becomes smaller. The snap-in receptacles 11 therefore represent axial through-openings between the outside and inside of the main body 6.

Snap-in teeth 14 of a holding ring 15 engage into the snap-in receptacles 11, said holding ring 15 also being a component of the eyepiece mount 2. The snap-in teeth 14 lock with locking noses 16 behind edge regions 17 in the main body 6 (see FIGS. 3 and 4) which, due to the reduction of the inside diameter of the main body 6, are formed in the region of the second outer circumference surface 10.

The inside diameter of the holding ring 15 corresponds to the outside diameter of the main body 6 between the second outer circumference step 10 and the third outer circumference step 12. The result is that, in the assembled position shown in the drawing, the holding ring 15 rests radially on a circumference surface section 18 between the second outer circumference surface 10 and the third outer circumference surface 12 of the main body 6, and axially on the second outer circumference surface 10 of the main body 6. The outer surface area of the holding device 15 increases in size starting from a first circumference surface section opposite the circumference surface section 18 of the main body 6 over a circumference step 19 toward a circumference section located away from the second outer circumference step 10 of the main body 6.

Figure 3:
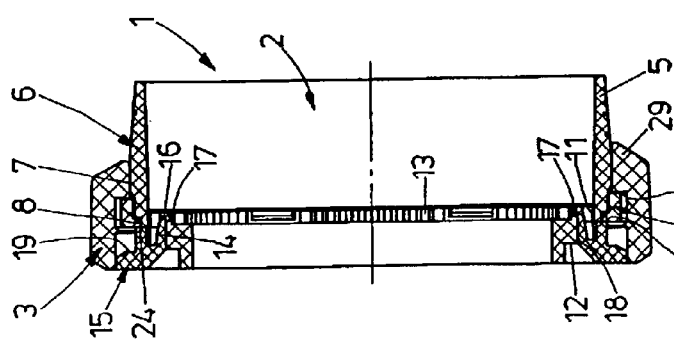
FIG. 3 shows a section through the eyepiece holding device of FIG. 1 according to a sectional plane containing the optical axis of the eyepiece, perpendicular to the sectional plane of FIG. 2.
Figure 2:
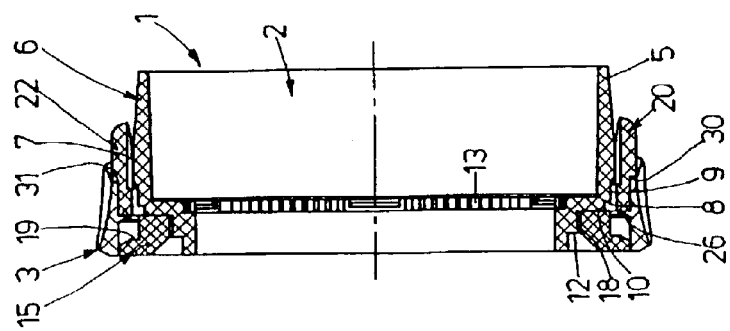
FIG. 2 shows a section through the eyepiece holding device of FIG. 1 according to a sectional plane containing the optical axis of the eyepiece.

FIGS. 1 through 3 show the eyepiece holding device 1 in a fixed position. In this position the marking ring 3 is fixed relative to the eyepiece mount 2 in a predetermined position, both in the axial direction, as well as in the circumferential direction. This fixing takes place by means of a snap-in locking ring 20.

The snap-in locking ring 20 has an elliptic basic shape. This shape is attained in such a way that the snap-in locking ring 20 is designed as one piece from respective opposite ring segment pairs with different diameters. A first ring segment pair 21 having a larger diameter has integral change-over clips 22, the function of which will be explained later. In the region of the ring segment pair 21 the snap-in locking ring 20 has its maximum inside and outside diameter. The second ring segment pair 23 of the snap-in locking ring 20, which has a smaller inside and outside diameter, has two integral snap-in projections 24 on its inner surface, which additionally reduce the inside diameter of the ring segment pair 23 at locations displaced by 90° in the circumferential direction of the snap-in locking ring relative to the ring segments of the ring segment pair 21. In the region of the snap-in projections 24 the snap-in locking ring 20 thus has its minimum inside diameter.

In the fixed position the snap-in locking ring 20 rests on the main body 6 in the region of the ring segments of the ring segment pair 21, with the snap-in projections 24 forming, together with the axially adjacent inner circumference areas of the snap-in locking ring 20, steps that are complementary to the first outer circumference step 8 of the main body 6 (see FIG. 3). On the side of the eyepiece mount 2 opposite the outer circumference step 8, the snap-in projections 24 rest on an axial front face 28 of the holding ring 15.

In the fixed position, an intermediate space remains in the region of the first ring segment pair 21 between the inner circumference surface of the snap-in locking ring 20 and the flat circumference area 9 of the main body 6 (see FIG. 2), so that a radial clearance exists there between the snap-in locking ring 20 and the main body 6.

The marking ring 3 incorporates an inner circumference step 25, which, together with two snap-in projections 26 (see FIG. 2) forms an axial blocking means in the region of the change-over clips 22 in the fixed position of the eyepiece holding device 1 for the snap-in locking ring 20 received in the marking ring 3. An inner surface section of the marking ring 3 of a smaller inside diameter adjoining the inner circumference step 25 is shaped as an inner toothed ring 27. In the circumference region of the snap-in projections 26 the inner toothed ring 27 is split, so that two semi-circular inner toothed ring segments are created. In the assembled position of the eyepiece holding device 1, the change-over clips 22 are located in the intermediate spaces formed by the split areas of the inner toothed ring 27 and are locked radially between the inner toothed ring segments 27 and axially by means of the snap-in projections 26. In the fixed position the inner toothed ring 27 of the marking ring 3 is in combing engagement with the outer toothed ring 7 of the main body 6.

FIG. 3 shows that in the fixed position an intermediate space remains in the region of the second ring segment pair 23 between the outer surface of the snap-in locking ring 20 located there and its opposed inner circumference surface of the marking ring 3, so that a radial clearance exists there between the snap-in locking ring 20 and marking ring 3.

Figure 4:
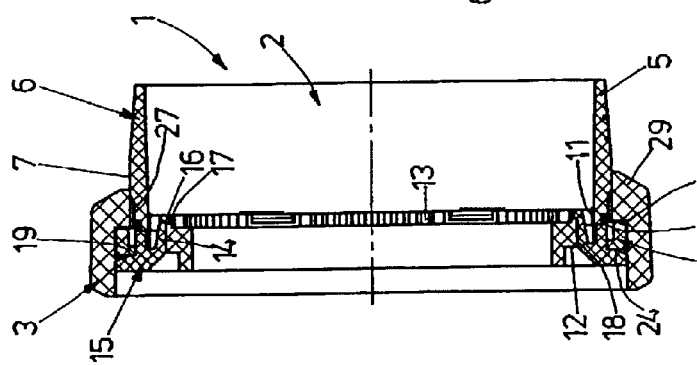
FIG. 4 shows a section through the eyepiece holding device similar to that in FIG. 3, in a displaced position.

FIG. 4 shows the eyepiece holding device 1 in a displacement position, in which the marking ring 3 can be rotated relative to the eyepiece mount 2.

In the displacement position the snap-in locking ring 20 is deformed relative to the fixed position in such a way that the outer surface of the snap-in locking ring 20 in the region of the second ring segment pair 23 rests on the inner surface area of the marking ring 3 opposite the former. The snap-in projections 24 thus have left the snap-in receptacles acting in the axial direction that are formed by the first outer circumference step 8 of the main body 6 on one hand and by the axial front end 28 of the holding ring 15 on the other hand. The snap-in locking ring 20 is, therefore, displaceable together with the marking ring 3 in the axial direction toward the holding ring 15 until it comes to rest in the displacement position shown in FIG. 2 at the circumference step 19 of the holding ring 15 which represents an axial end stop for this displacement movement.

In the position of the marking ring 3 relative to the main body 6 shown in FIG. 4, the outer toothed ring 7 of the main body 6 and inner toothed ring 27 of the marking ring 3 are out of engagement, so that the marking ring 3 can be rotated relative to the main body 6 around the rotation symmetry axis of the main body 6.

The deformation of the snap-in locking ring 20 from the fixed position (see FIGS. 2, 3) into the displacement position (see FIG. 4) takes place through radial pressure from outside onto the change-over clips 22. In the process the inside diameter of the snap-in locking ring 20 is reduced in the region of the first ring segment pair 21. Because of the basic shape of the snap-in locking ring 20 and intermediate space between the outer surface area of the snap-in locking ring 20 in the region of the second ring segment pair 23 and its opposite inside circumference area of the marking ring 3, the reduction of the inside diameter of the snap-in locking ring 20 in the region of the first ring segment pair 21 goes hand in hand with an enlargement of the inside diameter of the snap-in locking ring 20 in the region of the second ring segment pair 23. As a result, the snap-in projections 24 are displaced from their axial snap-in receptacles, as described above, and are now shifted relative to their position in their fixed position.

Resetting from the displacement position into the fixed position takes place by axially shifting the marking ring 3 relative to the main body 6 in such a way that the inner toothed ring 27 of the marking ring 3 is again in engagement with the outer toothed ring 7 of the main body 6. This shifting continues until the snap-in projections 24 snap in again, i.e., until they come into engagement with the snap-in receptacles acting in the axial direction. The marking ring 3 is protected against being shifted beyond the fixed position by means of the snap-in locking ring 20 on one hand, which is locked axially by means of the snap-in projections 24, and by means of the axial locking of the marking ring 3 to the snap-in locking ring 20 regarding this direction of movement by means of the snap-in projections 26 on the other hand. This latter movement lock is additionally also enhanced by locking steps 30 (see FIG. 2), that are executed in the change-over clips 22 and cooperate with a complementary locking step 31 in the marking ring 3.

Snapshots of the adjustment process of the marking ring 3 are shown in FIGS. 6 through 9. They show a detail of a pair of binoculars in the region of the eyepiece holding device 1.

Figure 6:
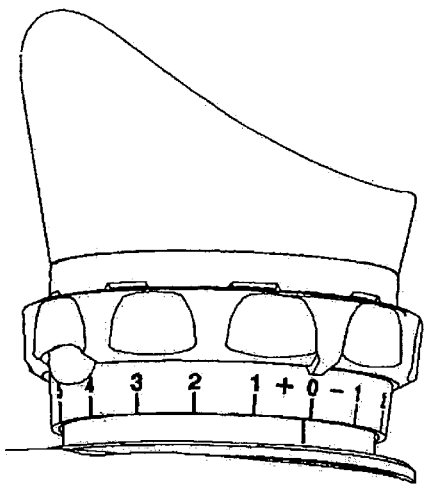
FIGS. 6 through 9 show snapshots during the displacement of a marking ring of the eyepiece holding device between two marking positions.

FIG. 6 shows the eyepiece holding device in a first fixed position. The marking nose 29 is located in a position in which it accentuates the numeral "0" on the dial 4.

Figure 7:
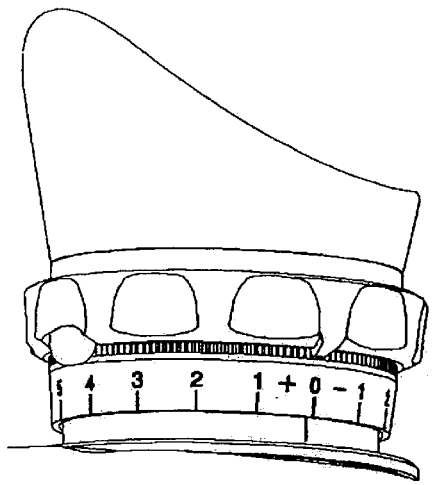

FIG. 7 shows the eyepiece holding device 1 in a first displacement position which, starting from the first fixed position of FIG. 6, was attained by radial pressure onto both change-over clips 22 and subsequent shifting of the marking ring 3 axially upward relative to the eyepiece mount 2

Figure 8:
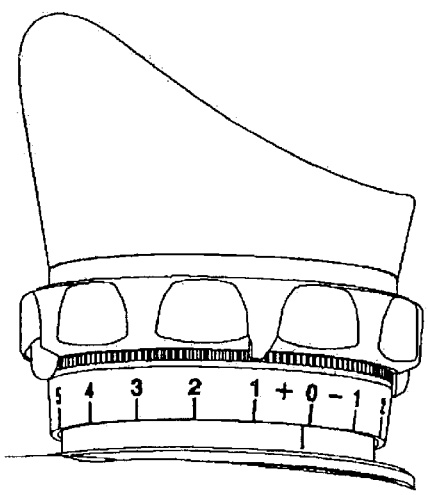

FIG. 8 shows the eyepiece holding device 1 in a second displacement position, which was attained relative to the first displacement position of FIG. 7 by rotating the marking ring 3 relative to the eyepiece mount 2. In the second displacement position the marking nose 29 is in a position in which it accentuates the numeral "+1" on the dial.

Figure 9:
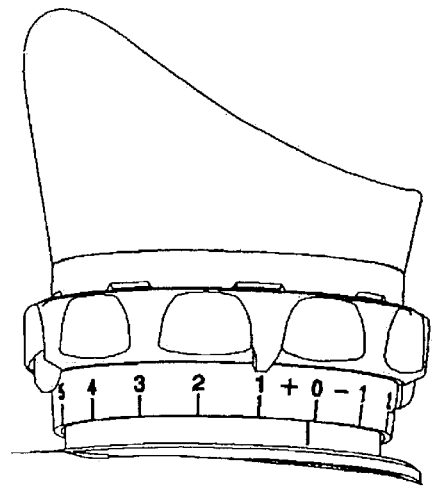

FIG. 9 shows a second fixed position of the eyepiece holding device 1, which has been created from the second displacement position of FIG. 8 by axially sliding the marking ring 3 back down relative to the eyepiece mount 2.

What is claimed is:

1. A holding device for an image-influencing optical component, especially for an eyepiece, of an optical image-forming device, especially an optical magnifying device wherein the optical component is axially displaceable along the optical axis of the image-forming device, incorporating a component holding element that is attached to and cannot move relative to the optical component, said component holding element having an adjustment marking, with a plurality of individual markings representing the current axial position of the optical component, wherein a marking member (3) to accentuate at least one individual marking of the adjustment marking (4);

wherein the marking member (3) is executed such that it is switchable between a displacement position in which it is displaceable relative to the component holding element (2) and a fixed position in which it is fixed relative to the component holding device (2) in a predefined position;

wherein fixing means (7, 20, 27), whereby the marking member (3) is fixed in the fixed position relative to the component holding element (2), comprise a snap-in locking device (20).

2. A holding device according to claim 1, wherein the snap-in locking device comprises a snap-in locking member (20) that is axially locked in the fixed position to the marking member (3) on one hand and to the component holding element (2) on the other hand, and which, in the displacement position, releases the marking member (3) and/or component holding element (2) to permit a relative displacement between the marking member (3) and the component holding element (2).

3. A holding device according to claim 2, wherein the snap-in locking member is executed as an externally accessible snap-in locking ring (20) such that the switching between the displacement position and the fixed position is caused or initialized by a change in the shape of the snap-in locking ring (20).

4. A holding device according to claim 3, wherein the snap-in locking ring (20) is supported in a receptacle recess (8, 28, 31) between the marking member (3) and component holding element (2) and has a shape differing from a circular form, wherein the snap-in locking ring (20) in the area (21, 23) where it has an extremal diameter in the locking position, blocks the marking ring (3) and/or the component holding element (2) and is executed such that the change in shape of the snap-in locking ring (20) produces a change in its extremal diameter.

5. A holding device according to claim 4, wherein the marking member (3) and/or component holding element (2) are executed as two parts with the connecting section located between the two parts (6, 15) in the region of the receptacle recess (8, 28, 31).

6. A holding device according to claim 4, wherein the snap-in locking ring (20) is accessible from outside via two change-over clips (22) that project from the receptacle recess (8, 28, 31).

7. An image-forming device having a holding device (1) according to claim 1.

8. The holding device for an image-influencing optical component according to claim 1, wherein the image-influencing optical component comprises binoculars or a telescope, wherein said adjustment marking is provided on a dial.

9. A holding device for an image-influencing optical component, especially for an eyepiece, of an optical image-forming device, especially an optical magnifying device wherein the optical component is axially displaceable along the optical axis of the image-forming device, incorporating a component holding element that is attached to and cannot move relative to the optical component, said component holding element having an adjustment marking, a dial, with a plurality of individual markings representing the current axial position of the optical component, wherein a marking member (3) to accentuate at least one individual marking of the adjustment marking (4);

wherein the marking member (3) is executed such that it is switchable between a displacement position in which it is displaceable relative to the component holding element (2) and a fixed position in which it is fixed relative to the component holding device (2) in a predefined position; and wherein the marking member is executed as a marking ring (3), wherein the fixing means (7, 20, 27) comprise a toothed ring (7) that is formed on the marking member (3) or component holding element (2) and cooperates with an opposite member (27) on the component holding element (2) or marking member (3) that complements the toothed ring (7) to block a rotating movement of the marking member (3) relative to the component holding element (2).

* * * * *